Nov. 5, 1968  R. G. VOSS  3,409,150
APPARATUS FOR HANDLING STACKED MEMBERS
Filed Dec. 19, 1966  2 Sheets-Sheet 1

INVENTOR.
R. G. VOSS
BY
ATTORNEYS

INVENTOR.
R. G. VOSS

United States Patent Office 3,409,150
Patented Nov. 5, 1968

3,409,150
APPARATUS FOR HANDLING STACKED MEMBERS
Raymond G. Voss, Bartlesville, Okla., assignor to Phillips Petroleum Company, a corporation of Delaware
Filed Dec. 19, 1966, Ser. No. 602,620
4 Claims. (Cl. 214—8.5)

ABSTRACT OF THE DISCLOSURE

Apparatus capable of receiving rows of stacked articles and unstacking these articles as single units.

This invention relates to a method and apparatus for handling individual members of a plurality of stacked members.

Many types of goods are packaged in containers, and then the containers are packaged in cartons or units and the cartons or units then stacked. Such cartons or units must then be unstacked and handled for further manufacturing or distribution steps.

In one embodiment, this invention comprises a roller table suitable for allowing a unit of stacked members to be rolled onto the table in a first direction and thereby temporarily stored. The table is equipped with a series of parallel bars. These parallel bars are driven by a moving means in order to move the rows of stacked members across the table in a direction different from that in which they roll onto a conveyor. The conveyor then transports a row consisting of units of stacked members back in the first direction into a means for accepting each unit of stacked members, elevating the entire stack to the upper portion of said means, supporting the unit of members by a flap support means, and then pushing the lowermost member out from under the stack and away from the handling means.

Accordingly, an object of this invention is to provide a method whereby individual members of a unit of stacked members can be handled.

Another object of this invention is to provide, in combination, a roller table and apparatus adapted to receive units of stacked members, move the units onto a conveyor, and individually handle each member of the unit by a handling means.

Other objects, advantages, and features of this invention will be readily apparent to those skilled in the art from the following description, drawing, and appended claims.

With reference to FIGURE 1, there is indicated a cross-sectional view of one embodiment of the conveyor and handling means.

Figure 3:
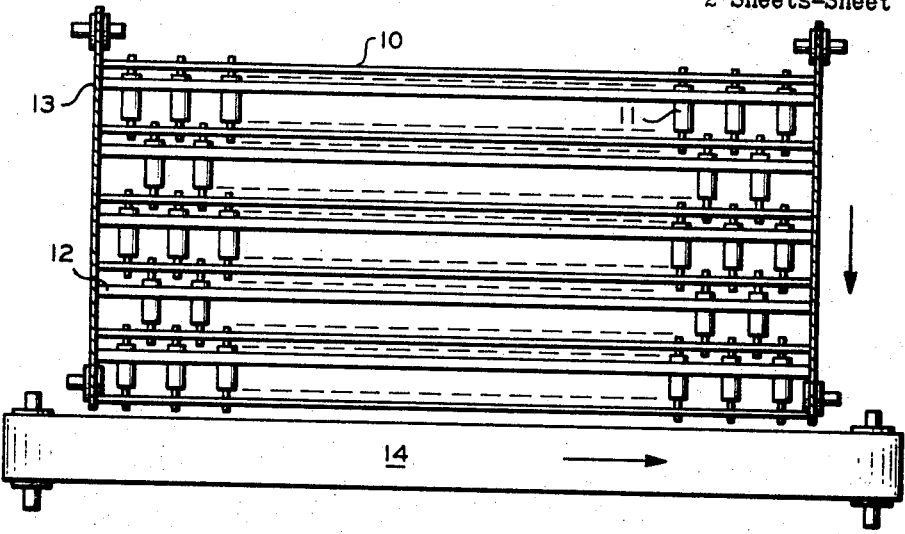
FIGURE 3 is a plan view of one embodiment of the roller table, moving means, and conveyor.
Figure 2:
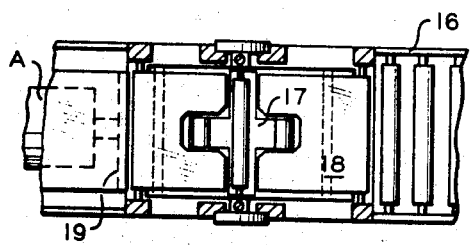
FIGURE 2 is a plan view of one embodiment of the flapper mechanism used to support the unit of members.
Figure 1:
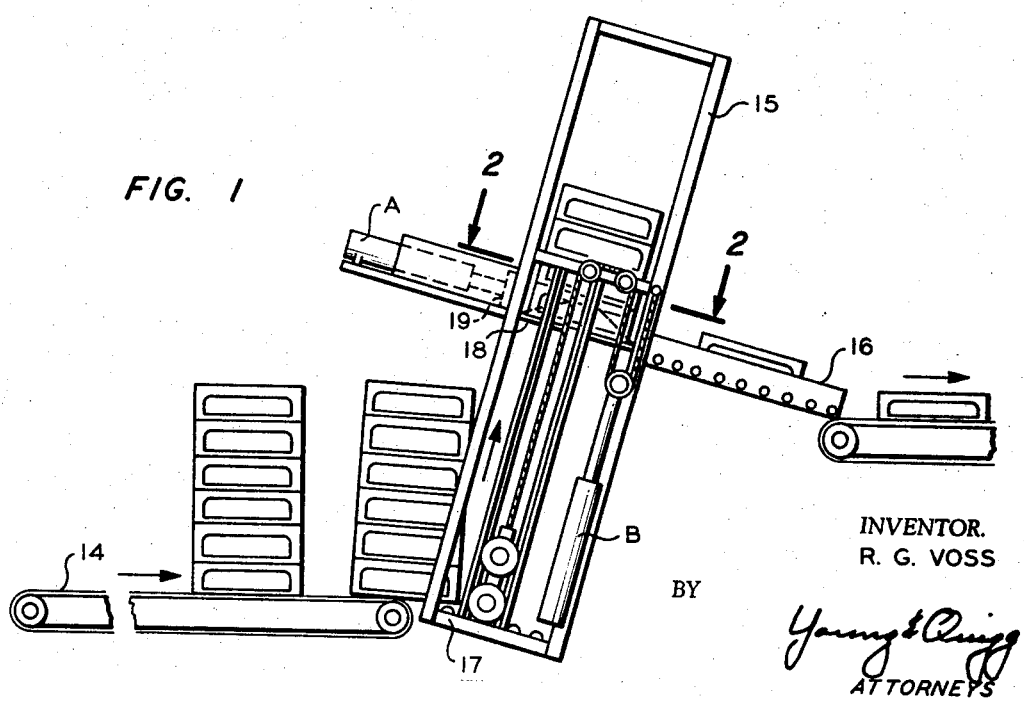
Figure 4:
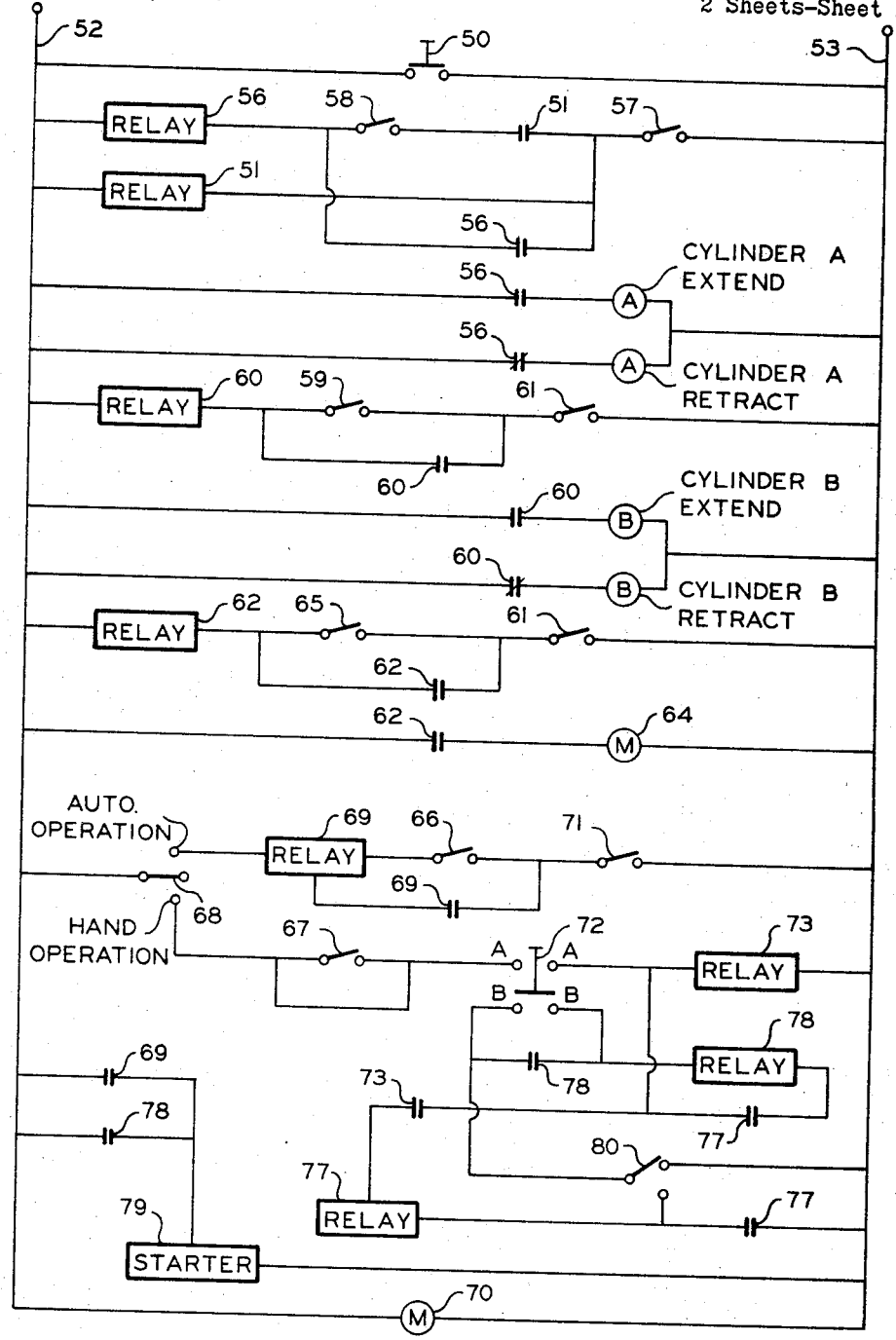
FIGURE 4 is a schematic diagram of the electrical circuit used to effect the sequence of functions necessary for operation of the invention.

The apparatus will now be described. With reference to FIGURE 3, there is indicated a roller table 10 comprising a framework supporting a plurality of rollers 11. Additionally, there are indicated parallel bars 12, affixed to a cable drive 13 so as to move the parallel bars perpendicular to the axis of the rollers. It is to be understood that parallel bars 12 can be replaced with any means adapted to move a unit of stacked members, and cable drive 13 can be replaced by any means adapted to move the bars. Furthermore, there is indicated a conveyor belt 14 positioned adjacent to said roller table so as to accept a row consisting of units of stacked members pushed off the table by the parallel bars 12. Other conveyor means other than a conveyor belt can be used. There are indicated in FIGURE 1, handling means 15 and roller chute 16. Handling means 15 comprises an elongated rectangular framework and housing of cross-sectional geometry suitable for handling the desired articles. Handling means 15 is adapted to accept a unit of stacked members received from the conveyor and further adapted to permit the exit of the individual stacked members from an exit for individual members residing in the upper portion of said means. Handling means 15 is positioned in a slightly nonvertical manner so as to accept a unit of said stacked members as it falls off the conveyor belt. Handling means 15 is equipped with an elevating means comprising an elevator platform 17 which is equipped with wheels to permit the unit of stacked members to roll into handling means 15 after falling off the conveyor belt. Elevator platform 17 is connected by a cable drive mechanism powered by pneumatic cylinder B. Said cable drive mechanism, when actuated by clinder B retracting, causes elevator platform 17 to rise through said handling means to transport the unit of stacked members to the upper portion of the handling means. As the unit of stacked members ascends upward, flap support means 18 hinges upward so as to permit the unit of stacked members to rise therethrough. As is indicated in FIGURE 2, in this embodiment flap support means 18 comprises two flaps hinged at either end; however, it is fully within the scope of this invention to provide any number of flaps hinged in any way so as to permit a unit of stacked members to proceed upward therethrough and subsequently be supported by said flap support means. Flap support means 18 derives its support function from the fact that the hinge feature operates only in one direction. Thus, after the unit of stacked members has proceeded through this flap support, elevator platform 17 proceeds to its original position, but the unit of members is retained in the upper portion of said handling means by said flap support and are positioned so as to be pushed from said handling means. Elevator platform 17 is configured so that it can pass through the opening between flap support means 18 which have returned to the lowered portion. There is indicated, additionally, pushing means 19. Pushing means 19 comprised, in one embodiment, a rectangular solid pusher moved by cylinder A so as to replace the member pushed out by the pusher. Stated another way, the pusher is generally the same size and shape as the member to be pushed and the pusher replaces the member pushed out. As the member is pushed out, the stack of remaining members rests on the pusher until it is withdrawn, at which time the stack falls to the support. Other pushers can be used as long as there is maintained the function of supporting the stack during the pushing operation and allowing the stack to fall down on the support after the pusher has been withdrawn. In one embodiment, the pushing means 19 was powered by a pneumatically powered cylinder A; however, the pushing means can be powered in any way that will result in the proper functioning of the apparatus. The pushing means is constructed so as to push the lowermost member of said unit out from between support means 18 and the next member above said lowermost member. Handling means 15 is additionally equipped with a means to convey the pushed member away from said handling means which, in one embodiment, comprised roller chut 16. Roller chute 16 then removes said individual member from the handling means and conducts it to further processing or distribution.

The sequence of operation of the invention is determined by a circuit and switches which will subsequently be described. First, however, the physical operation of this invention will be described without reference to the circuit.

According to the operation of this invention, units comprising a plurality of stacked members are placed between parallel bars 12. As has been previously noted, parallel bars 12 have been spaced so as to permit the entry of said units. Additional units are then placed between parallel bars 12 by rolling said units down the table and this process is continued until an entire row of units has been loaded on roller table 10 between one set of parallel bars 12. According to this invention, the roller table can be used either as a storage means, in which case the entire table will be filled with rows of stacked units, or each row can be handled as it is filled. In one embodiment, thermoformed polyolefin products were stacked in a series of rows covering the entire table so as to cool and cure the polyolefin products. Next, cable driving mechanism 13 is activated by a feature to be later explained and parallel bars 12 move a row of units of stacked members onto conveyor belt 14. The cable drive means 13 then stops until the entire row of units is removed from conveyor belt 14 at which time it automatically places another row on conveyor belt 14. After the row of units has been placed on conveyor belt 14, said conveyor belt 14 automatically moves forward so as to allow each unit to drop off the end into handling means 15 whereupon conveyor belt 14 stops. Although a conveyor belt was used in this embodiment, it is fully within the scope of this invention to use any means capable of conveying a row of units to handling means 15. After the unit of stacked members is dropped into handling means 15, elevator platform 17, being operated by pneumatic cylinder B powering a cable drive, raises the unit through flap support means 18, whereupon flap support means 18 permits the unit to pass therethrough, then shuts to its original position. Retraction of cylinder B causes elevator platform 17 to rise. Elevator platform 17 then proceeds downward due to cylinder B extending, whereupon unit of stacked members is supported by flap support means 18. Elevator platform 17 then returns to its original position and conveyor belt 14 advances to permit another unit of stacked members to fall into handling means 15. After a unit of stacked members has been raised through flap support means 18 and elevator platform 17 has returned to its original position, pushing means 19 pushes the lowermost member from between flap support means 18 and the member next above said lowermost member. The pushing action was continued until pushing means 19 caused the lowermost member to be ejected from handling means 15 at which time the lowermost member slides down roller chute 16 to further processing or distribution. In summary, pushing means 19 repeats the above cycle of pushing until each member of the unit is individually removed from the handling means. At this point, elevator platform 17 raises another unit up through flap support means 18 and then returns to its original position. The unit raised, as previously noted, is then supported by flap support means 18. Conveyor belt 14 then advances to place another unit in handling means 15 and the pushing operation is repeated in a like manner. According to the operation of this invention, the members stacked in units to be handled can comprise any members that will stack so as to move through the inventive apparatus properly. Particularly, cartons or manufactures of a generally rectangular solid shape are satisfactory. In one embodiment, thermoformed polyolefin beverage cases were removed from the thermoforming steps and the table completely filled with stacks of beverage cases during the cooling and curing operation.

The circuit and switching operation associated with the sequence of operation will now be described. To facilitate a description of the system operation it will be assumed initially that there are members in the upper portion of the handling means being supported by the flap support, members in the lower portion of the handling means ready to be elevated upward after the upper stack has been depleted, members on the conveyor belt, and members on the roller table. Subsequently, the normal operation, including a start-up, will be described.

Prior to an explanation of the system operation, it must be noted that a basic interlock system has been designed into the circuit to prevent stroking of cylinder A (residing within pushing means 19 and providing power to push the members from the handling means) if cylinder B (providing power to move elevator platform 17 to the upper portion of the housing with a stack of members) is not in its home (extended) position. The reverse is also true; that is, cylinder A must be home (not extended) before cylinder B can stroke. Included in the interlock system is a lockout so that the conveyor belt drive motor cannot be run unless cylinder B is in its home position. These features, along with a detailed description of the circuit will now be presented.

Beginning with the initial conditions as described above existing in the system, switches 57 and 58 were closed and upon actuation of the start button 50, timer relay 51 was energized with a 115 volt 60-cycle line signal placed across leads 52 and 53. When the time for which the timer had been set had elapsed, its contacts closed allowing relay 56 to energize which, in turn, stroked cylinder A, powering pushing means 19, thus pushing a member from under the stack of members and away from the handling means via roller chute 16. At the end of cylinder A's stroke, it opened switch 57 which reset timer relay 51 and also de-energized relay 56 allowing cylinder A to retract. The cycle continued to repeat as long as there were members in the upper portion of the handling means, as indicated by switch 58 being positioned in the closed position. Stated another way, cylinder A will cycle as described above until the upper portion of the handling means is depleted of members.

When all the members in the upper portion of the handling means have been pushed from handling means 15, switch 58 opened which stopped cylinder A from stroking and switch 59 closed thus energizing relay 60 due to switch 61 being previously closed. This allows cylinder B to stroke thus lifting a unit member into the top of the elevator. At the end of cylinder B's stroke (cylinder has actually been retracted within itself), switch 61 opened, de-energizing relay 60 and allowing cylinder B to return to its home position. Switch 59 was then opened, stopping further action of cylinder B.

When elevator platform 17 returns to the bottom of the handling means, switch 61 closed. This allowed relay 62 to be energized which applied power to the conveyor belt motor 64. The conveyor will advance until a stack of members is moved into the bottom of the handling means at which time switch 61 will be opened, dropping out relay 62 which shuts off the conveyor belt motor 64.

The above controls continued to cycle as demanded. After a sufficient number of cycles, the conveyor belt emptied and switch 65 opened.

At this time switches 66 and 67 were closed. If switch 68 is in the "Automatic Operation" position, relay 69 will be energized which turns on power to drive motor 70 powering the means moving the parallel bars on the roller table. After the parallel bars have advanced one row, switch 71 will be pulsed which de-energizes relay 69. Switch 66 will be opened by members on the conveyor and the cycle will not repeat again until the conveyor belt is again empty. Had switch 68 been in the "Hand Operation" position, the above functions would be identical to the "Automatic" position except the row must be moved on the conveyor by positioning the "Forward" button 72 in the A position. The system can be shut down when button 72 is positioned in the B position.

Normal operation, including the start-up, will now be described. In summary, the operator placed switch 68 in the "Hand Operation" position, pushed the "Start" button 50, pushed the "Forward" button 72, and filled the roller table completely with units of stacked members by repeatedly pushing the "Forward" button. By pushing the "Forward" button the roller table bars advanced one row. It is necessary for the operator to push the "Forward" button *after* each row on the roller table has been filled so the entire table can be loaded.

The following is a detailed description of the above summary of table loading. Since there were no members on the conveyor initially, switch 67 was closed. With switch 68 in the "Hand Operation" position, relay 73 was energized, blocking operation of relay 77. As the "Forward" button 72 was moved to the B position by pushing the button, relay 78 was energized. This applied power to the parallel bars motor starter 79. When the operator moved the "Forward" button to the A position by releasing it, relay 73 was energized to advance the bars. As the bars advanced one row, switch 80 was pulsed momentarily which energized relay 77 killing power to 78. The cycle was repeated until the table had been filled with rows of units of stacked members.

Once the roller table had been filled and the bars advanced one row so as to fill the conveyor, switch 68 was placed in the "Automatic Operation" position. With switch 68 in the "Automatic Operation" position, once a row of stacked members are placed on the conveyor, the conveyor, will move units of stacked members into the bottom of the handling means, whereupon the conveyor will stop and cylinders A and B will start to cycle as earlier described. After the entire row has been handled, the parallel bars move another row on the conveyor until the entire roller table has been depleted of units of stacked members.

This invention is thus broadly applicable to the handling of individual members of a plurality of stacked members.

Various modifications of this invention can be made in view of the foregoing disclosure and the appended claims without departing from the spirit or scope thereof.

What is claimed is:

1. Apparatus for handling individual members of a unit of stacked members comprising a roller table adapted to roll a unit of said stacked members in a first direction; means adapted to move said unit of members across said table in a second direction to a conveyor; a conveyor positioned and adapted to accept said unit moved in said second direction and to convey said unit in said first direction; handling means adapted to receive said unit conveyed by said conveyor, transport said unit to the upper portion of said handling means, and push the lowermost member of the unit out from under said unit and away from said handling means.

2. The apparatus of claim 1 wherein said means adapted to move a unit of said stacked members comprises a series of parallel bars attached to a means to move said bars, said bars spaced to allow said unit of stacked members to roll between said bars, said means for moving the bars adapted to move a unit of stacked members to said conveyor.

3. The apparatus of claim 2 wherein said handling means comprises an elongated rectangular housing adapted to permit the entry of said unit of members in the lower portion and to permit the exit of said members individually from the upper portion of said housing; elevating means within said housing adapted to raise to the upper portion of said housing said unit of members entering the housing; supporting means contacting the lowermost member of said unit, said supporting means residing in the upper portion of said housing and adapted to support said unit of members raised to the upper portion of said housing and further adapted to position the lowermost member adjacent to said exit for individual members; pushing means adapted to push the lowermost member of said unit from between said support means and the member above said lowermost member of unit, said pushing means further adapted to push said member through said exit for individual members; means to convey said member away from said exit for individual members.

4. The apparatus of claim 3 wherein said supporting means comprises a single or plurality of hinged flaps adapted to rotate upward to allow said unit of members to pass upward through said flaps to the upper portion of said housing, said flaps further adapted to close after said unit of members has passed therethrough and support said unit of members by supporting said lowermost member.

References Cited

UNITED STATES PATENTS 3,289,861  12/1966  Carle _____ 214—8.5

FOREIGN PATENTS 1,156,884  11/1963  Germany.

ROBERT G. SHERIDAN, *Primary Examiner.*

GEORGE F. ABRAHAM, *Assistant Examiner.*